(12) United States Patent
Todhunter et al.

(10) Patent No.: US 8,311,999 B2
(45) Date of Patent: Nov. 13, 2012

(54) SYSTEM AND METHOD FOR KNOWLEDGE RESEARCH

(75) Inventors: James Todhunter, Framingham, MA (US); Yaraslau Bialiauski, Malden, MA (US); Laurie Yael Brykman-Weiser, Fairfax, VA (US)

(73) Assignee: Invention Machine Corporation, Boston, MA (US)

( * ) Notice: Subject to any disclaimer, the term of this patent is extended or adjusted under 35 U.S.C. 154(b) by 307 days.

(21) Appl. No.: 12/723,479

(22) Filed: Mar. 12, 2010

(65) Prior Publication Data

US 2010/0235340 A1 Sep. 16, 2010

Related U.S. Application Data

(60) Provisional application No. 61/160,026, filed on Mar. 13, 2009.

(51) Int. Cl.
*G06F 17/30* (2006.01)
(52) U.S. Cl. .......................................... 707/706
(58) Field of Classification Search ................. 707/2, 3, 707/706; 709/223
See application file for complete search history.

(56) References Cited

U.S. PATENT DOCUMENTS

| | | | |
|---|---|---|---|
| 5,418,889 A | 5/1995 | Ito | |
| 5,638,543 A | 6/1997 | Pedersen et al. | |
| 5,696,916 A | 12/1997 | Yamazaki et al. | |
| 5,708,825 A | 1/1998 | Sotomayor | |
| 5,715,468 A | 2/1998 | Budzinski | |
| 5,748,973 A | 5/1998 | Palmer et al. | |
| 5,774,845 A | 6/1998 | Ando et al. | |
| 5,924,108 A | 7/1999 | Fein et al. | |
| 5,978,820 A | 11/1999 | Mase et al. | |
| 6,026,388 A | 2/2000 | Liddy et al. | |
| 6,076,088 A | 6/2000 | Paik et al. | |
| 6,094,652 A | 7/2000 | Faisal | |
| 6,128,634 A | 10/2000 | Golovchinsky et al. | |
| 6,167,370 A | 12/2000 | Tsourikov et al. | |
| 6,185,592 B1 | 2/2001 | Boguraev et al. | |
| 6,205,456 B1 | 3/2001 | Nakao | |
| 6,212,494 B1 | 4/2001 | Boguraev | |
| 6,246,977 B1 | 6/2001 | Messerly et al. | |
| 6,263,335 B1 | 7/2001 | Paik et al. | |
| 6,317,708 B1 | 11/2001 | Witbrock et al. | |
| 6,338,034 B1 | 1/2002 | Ishikawa et al. | |
| 6,349,316 B2 | 2/2002 | Fein et al. | |

(Continued)

FOREIGN PATENT DOCUMENTS

CN 101702944 5/2010

(Continued)

OTHER PUBLICATIONS

Kupiec, Julian, et al., "A Trainable Document Summarizer," ACM Press Proceeding of the 18th Annual International ACM SIGIR Conference on Research and Development in Information Retrieval, pp. 68-73, 1995.

(Continued)

*Primary Examiner* — Etienne Leroux
(74) *Attorney, Agent, or Firm* — Onello & Mello, LLP (57) ABSTRACT

Knowledge research and mapping system and method automatically construct a knowledge research map representing the researched topics, their inter-relationships, and related responses retrieved through the processing of, for example, a natural language or Boolean query that is automatically submitted via a knowledge search tool to a database.

17 Claims, 10 Drawing Sheets

U.S. PATENT DOCUMENTS

| | | | |
|---|---|---|---|
| 6,363,378 | B1 | 3/2002 | Conklin et al. |
| 6,374,209 | B1 | 4/2002 | Yoshimi et al. |
| 6,401,086 | B1 | 6/2002 | Bruckner |
| 6,424,362 | B1 | 7/2002 | Bornstein et al. |
| 6,442,566 | B1 | 8/2002 | Atman et al. |
| 6,537,325 | B1 | 3/2003 | Nishizawa |
| 6,557,011 | B1 | 4/2003 | Sevitsky et al. |
| 6,701,345 | B1 | 3/2004 | Carley et al. |
| 6,754,654 | B1 | 6/2004 | Kim et al. |
| 6,789,230 | B2 | 9/2004 | Katariya et al. |
| 6,823,325 | B1 | 11/2004 | Davies et al. |
| 6,823,331 | B1 | 11/2004 | Abu-Hakima |
| 6,829,603 | B1 | 12/2004 | Chai et al. |
| 6,871,199 | B1 | 3/2005 | Binnig et al. |
| 7,035,877 | B2 | 4/2006 | Markham et al. |
| 7,120,574 | B2 | 10/2006 | Troyanova et al. |
| 7,251,781 | B2 | 7/2007 | Batchilo et al. |
| 2001/0049688 | A1 | 12/2001 | Fratkina et al. |
| 2002/0010574 | A1 | 1/2002 | Tsourikov et al. |
| 2002/0103793 | A1 | 8/2002 | Koller et al. |
| 2004/0019588 | A1* | 1/2004 | Doganata et al. .......... 707/3 |
| 2005/0055385 | A1 | 3/2005 | Sinha et al. |
| 2005/0187923 | A1 | 8/2005 | Cipollone |
| 2006/0041424 | A1 | 2/2006 | Todhunter et al. |
| 2006/0167931 | A1 | 7/2006 | Bobick et al. |
| 2006/0242195 | A1 | 10/2006 | Bove et al. |
| 2007/0006177 | A1 | 1/2007 | Aiber et al. |
| 2007/0050393 | A1 | 3/2007 | Vogel et al. |
| 2007/0073651 | A1 | 3/2007 | Imielinski |
| 2007/0156393 | A1 | 7/2007 | Todhunter et al. |

FOREIGN PATENT DOCUMENTS

| | | |
|---|---|---|
| EP | 2135175 | 12/2009 |
| KR | 10-2009-0130854 | 12/2009 |
| WO | 2005083597 | 9/2005 |
| WO | 2008113065 | 9/2008 |

OTHER PUBLICATIONS

Goldstein, et al., "Summarizing Text Documents: Sentence Selection and Evaluation Metrics," Proceedings of the 22nd annual international ACM SIGIR conference on Research and development in information retrieval, 1999, pp. 121-128.

International Search Report dated Jul. 30, 2008 issued in corresponding International Application No. PCT/US2008/057183.

Girju, et al., "Automatic Discovery of Part-Whole Relations," Association for Computational Linguistics, Mar. 2006, pp. 83-135, vol. 32, No. 1, Mit Press, Cambridge, MA, USA.

Extended European Search Report dated Apr. 1, 2011 issued in corresponding European Application No. 08732326.7.

International Search Report dated Sep. 29, 2010 issued in corresponding International Application No. PCT/US2010/027223.

* cited by examiner

SYSTEM AND METHOD FOR KNOWLEDGE RESEARCH

RELATED APPLICATIONS

This application claims the benefit of priority under 35 U.S.C. §119(e) from co-pending, commonly owned U.S. Provisional Application Ser. No. 61/160,026, titled "System and Method for Knowledge Research," filed Mar. 13, 2009, which is incorporated herein by reference in its entirety.

The present application, while not claiming priority to, may be related to the following United States patent application: U.S. Pat. No. 7,251,781, filed Jul. 31, 2002, titled "Computer Based Summarization of Natural Language Documents," (published as U.S. Patent Application Pub. No. 20030130837 on Jul. 10, 2003), which claims priority to U.S. Provisional Application Ser. No. 60/308,886, titled "Computer Based Summarization of Natural Language Documents," filed Jul. 31, 2001. These applications are incorporated herein by reference in their entirety.

FIELD OF INTEREST

This application relates to systems and methods of automatic knowledge search for access to information stored in computer-based database systems. More specifically, the present application relates to the navigation of information networks and the automatic capture of the research thought processes in an interactive knowledge search environment.

BACKGROUND

During the history of information technology, it has been a struggle to organize and understand ever increasing volumes of data. While many developments have been made in the area of Relational Database Systems and Business Intelligence Systems to help in the management of structured data, the domain of unstructured and heterogeneous data management is still extremely inefficient. Keyword search technology remains the predominant access model. Recent advances in semantic technology have yielded improvements in the accuracy and relevance of information retrieved by such search operations.

Figure 1:
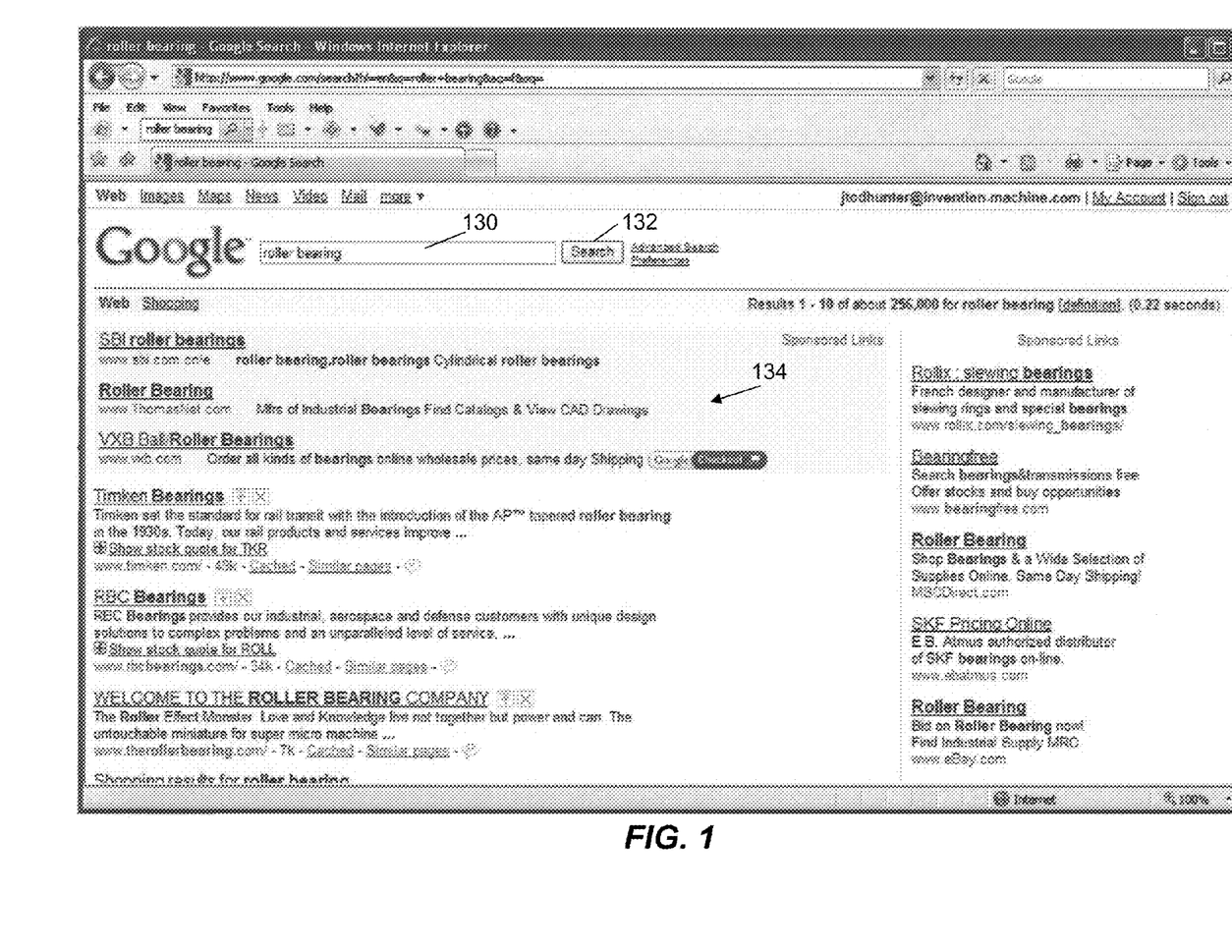
FIG. 1 illustrates an embodiment of a user interface for retrieving query results according to the prior art.

However, the paradigm of search remains poorly suited to the needs of a researcher. Researchers issue queries and receive results, but in many cases the results are overwhelming in number, and much time must be invested in sifting through results to find the pieces of specifically important information. FIG. 1 illustrates a user interface for retrieving query results using a conventional keyword search application. Specifically, in FIG. 1, a Google™ search is illustrated. A keyword, namely, "roller bearing," is entered into a search box 130. When the Search button 132 is selected, a list of results 134 for "roller bearing" is returned.

Figure 2:
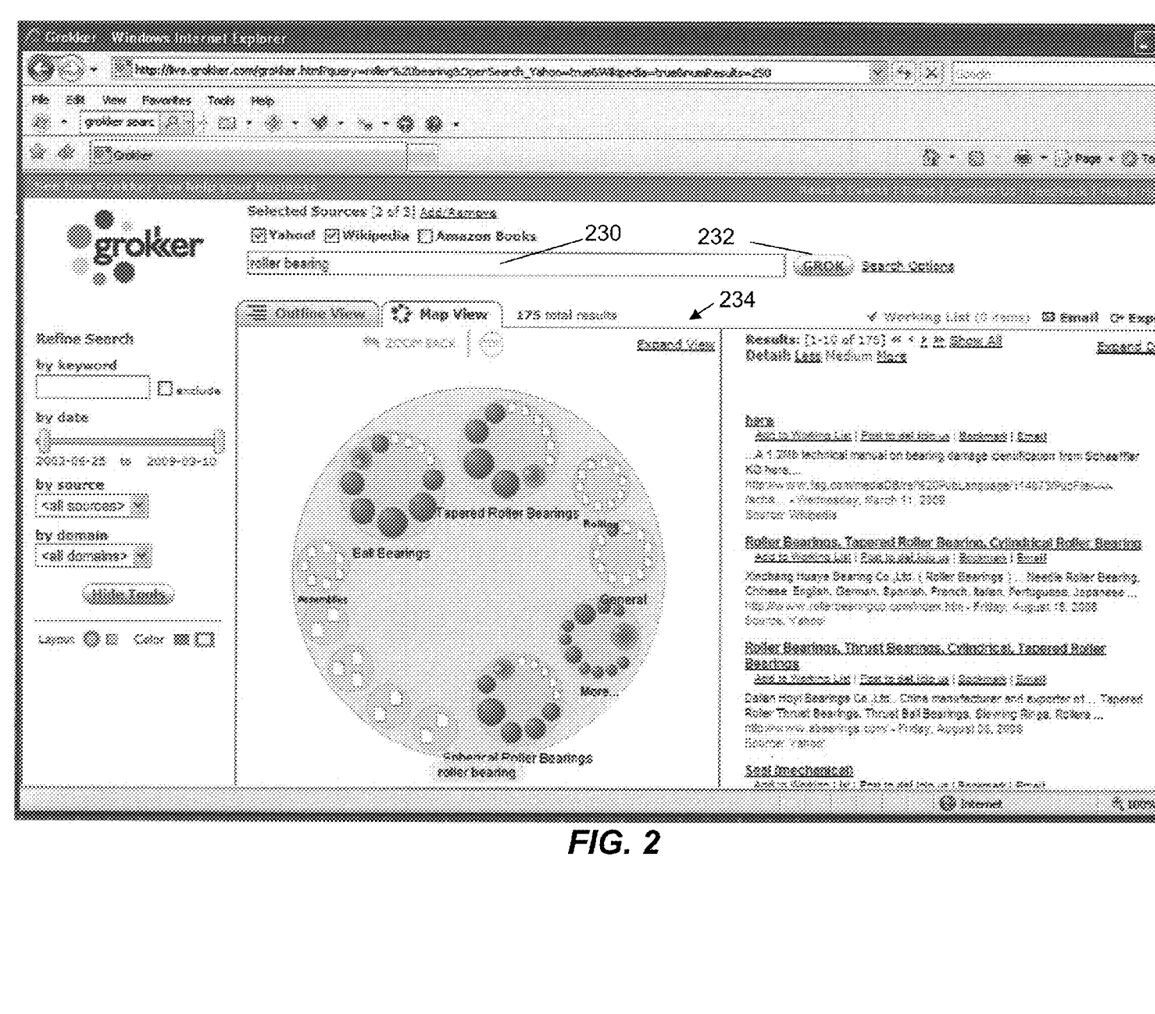
FIG. 2 illustrates an embodiment of a user interface for data visualization according to the prior art.

Knowledge visualization technology has been developed to help the user better understand the scope and content of result sets. Similarly, ontologically oriented systems of access, such as the semantic web, attempt to provide guidance to the researcher through the exposure of a navigational taxonomy that allows the user to select subsets of information based on taxonomical terms. FIG. 2 illustrates a user interface for data visualization, as an example of a knowledge visualization tool. Specifically, in FIG. 2, a Grokker® search is illustrated. A keyword, namely, "roller bearing," is entered into a search box 230. When the Search button ("Grok") 232 is selected, search results 234 returned for "roller bearing" are displayed in a "Map View."

These conventional navigational systems suffer from a deficiency in that taxonomy is removed from a researcher's intent of analysis. This creates a gap of understanding that the researcher must bridge in order to effectively benefit from the presented view of information.

Another key deficiency with conventional search technologies is their transactional nature. Each search is a completely independent event and there is no persistent information that links events in a research session. This independence of actions is inherently inconsistent with the researcher's intent.

Often, researchers use search technologies not for the purpose of issuing a single query, but for the purpose of delving into a subject area through a series of search requests that are related through the researcher's intent. Current search and concept retrieval tools lack the ability to maintain this connection in a meaningful way. As a result, the research worker must specifically record and track the relationships between related search requests and their generated result sets. This process is very tedious, time consuming, and subject to error if the researcher neglects to capture any part of the process.

SUMMARY

In accordance with various aspects of the present invention, provided are computer-based methods and systems for providing automated knowledge research and mapping capabilities.

In one embodiment, database knowledge search tools are augmented by the inclusion of research locus change identification capabilities and user intent based results with filtering capabilities, such that when a query is submitted, it is automatically classified by its relationship to recent queries and query results are filtered and presented to the researcher in a framework based on the domain of research. In this embodiment, user interactions with the result set are also identified as indicators of user intent. The submitted query is processed as a query to one or more databases, and responses to this query from the databases are automatically provided, the responses being filtered in accordance with the categorization of key subject matter as defined by a knowledge domain concept map. Specific filtered responses are arranged for presentation to the user. A machine representation of a user's research process can be automatically generated from the query relationship classification and other user intent indicators, such as the issuance of a sub-query or the selection and saving of a specific result.

In accordance with aspects of the invention, different domains of research will suggest different user concept maps and result in different result presentation models.

Similarly, the submitted query foiinats will preferably vary with the knowledge search technologies applied. For example, a natural language query may be used for search engines using semantic algorithms and a keyword query may be used for less sophisticated engines.

In accordance with aspects of the invention, there are a number of specific techniques which may be used to perform the classification of a specific query's relationship to prior queries, such techniques can include the extracting of key properties from the specific query to create a query profile and comparing the query profile with the profiles of prior queries.

In accordance with one aspect of the invention, provided is a computer-based method of knowledge research and mapping. The method includes providing at least one computer processor coupled to at least one non-transitory storage medium. The at least one computer processor is arranged to perform a set of processing tasks, including: receiving a query related to a domain of research; storing the query in a research knowledge map in the at least one computer storage medium; automatically submitting the query to one or more knowledge bases; filtering one or more responses to the query into response relationship subsets; and linking one or more of the responses from the response relationship subsets to the stored query in the research knowledge map. The knowledge map provides interrelated information for one or more queries within the domain of research.

The method can further include generating the research knowledge map using an entity-relationship model comprising entity-relationship-entity triplets, including representing topics determined from the one or more queries as entities and determining relationships between entities from an informational taxonomy.

The entities representing one or more queries can have linked to them one or more responses to the queries.

The response relationship subsets can be classified as subgroups of the one or more responses to the query that are related through a common relationship of information taxonomy with the query.

Submitting the query to one or more knowledge bases can include submitting the query to a knowledge search engine and automatically formatting the query to be compatible with the knowledge search engine.

The method can include formatting the query as either a natural language query or a keyword query.

The knowledge search engine can include a semantic indexing and search tool and the one or more knowledge bases can include a semantic analysis knowledge base.

The knowledge bases can include one or more knowledge bases selected from a group consisting of: one or more locally accessible knowledge bases; one or more knowledge bases containing corporate knowledge; and one or more publicly accessible knowledge bases.

The method can further include recording user interactions during a research session related to the query and storing machine representations of the user interactions in the research knowledge map.

In accordance with another aspect of the invention, provided is a knowledge research and mapping system. The system includes at least one computer processor coupled to at least one non-transitory storage medium. The system further includes: a query input module that: receives a query related to a domain of research; stores the query in a research knowledge map; and submits the query to one or more knowledge bases. The system further includes: a results presenter that filters one or more responses to the query into response relationship subsets; and a research event recorder that links one or more responses from the response relationship subsets to the stored query in the research knowledge map. The knowledge map provides interrelated information for one or more queries within the domain of research.

The at least one processor can generate the research knowledge map using an entity-relationship model comprising entity-relationship-entity triplets, such that topics determined from the one or more queries are represented as entities and relationships between entities are determined based on an infoiniational taxonomy.

The entities representing one or more queries can have linked to them one or more responses to the queries.

The response relationship subsets can be classified as subgroups of the one or more responses to the query that can be related through a common relationship of information taxonomy with the query.

The query input module can submit the query to a knowledge search engine and format the query to be compatible with the knowledge search engine.

The query can be formatted as either a natural language query or a keyword query.

The knowledge search engine can include a semantic indexing and search tool and the one or more knowledge bases can include a semantic analysis knowledge base.

The knowledge bases can include one or more knowledge bases selected from a group consisting of one or more locally accessible knowledge bases; one or more knowledge bases containing corporate knowledge; and one or more publicly accessible knowledge bases.

The research event recorder can record user interactions during a research session related to the query and store machine representations of the user interactions in the research knowledge map.

In accordance with another aspect of the present invention, provided is a computer program product having computer-executable instructions stored in at least one non-transitory computer-readable medium, which perform a method of knowledge research and mapping when executed by at least one processor. The method includes providing at least one computer processor coupled to at least one non-transitory storage medium. The at least one computer processor: receives a query related to a domain of research; stores the query in a research knowledge map in the at least one computer storage medium; automatically submits the query to one or more knowledge bases; filters one or more responses to the query into response relationship subsets; and links one or more of the responses from the response relationship subsets to the stored query in the research knowledge map. The knowledge map provides interrelated information for one or more queries within the domain of research.

The method can further include generating the research knowledge map using an entity-relationship model comprising entity-relationship-entity triplets, including representing topics determined from the one or more queries as entities and determining relationships between entities from an informational taxonomy.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention.

DETAILED DESCRIPTION

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These teems are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Embodiments of the present invention enhance the use of various knowledge search tools by providing the ability to readily understand the context of the user's research and capture the process of research steps preformed by the user. This enhancement is provided by, for example, the ability to see a visualization of the high-level topics of interest researched by the user and the conceptual relationships that exist between those topics.

Figure 3:
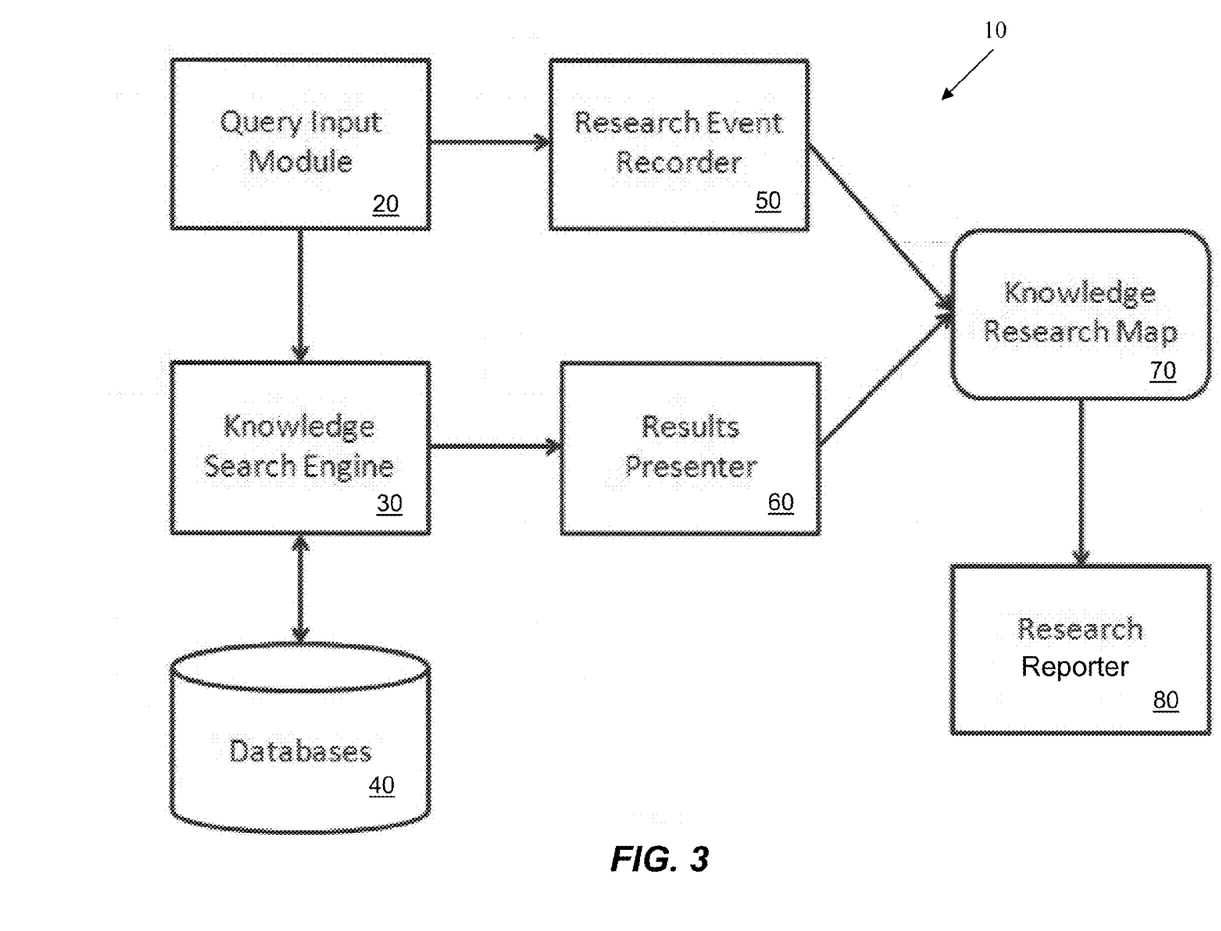
FIG. 3 is a high-level architecture diagram of an embodiment of a set of functional modules or processors, which can be implemented in one or more computers, in a knowledge search and mapping system, in accordance with aspects of the present invention.

FIG. 3 shows a high-level architecture diagram of an embodiment of a knowledge search and mapping system 10, according to aspects of the present invention. The knowledge search and mapping system 10 can be implemented in or by one or more computers. In this embodiment, system 10 can include a set of functional modules or processors that collectively achieve the system functionality. In this embodiment, these functional modules or processors include: a Query Input Module 20, for example, an interface for the submission and receipt of a query; at least one Knowledge Search Engine 30; one or more searchable Databases 40; a Research Event Recorder 50, which identifies and stores user interaction data; a Results Presenter 60, which filters and presents query results in a structure derived from a domain of research; a Knowledge Research Map 70, which includes a machine representation of user interaction data and stored selected query results; and a Research Reporter 80, which makes the information stored in the Knowledge Research Map 70 available to the user.

Figure 8:
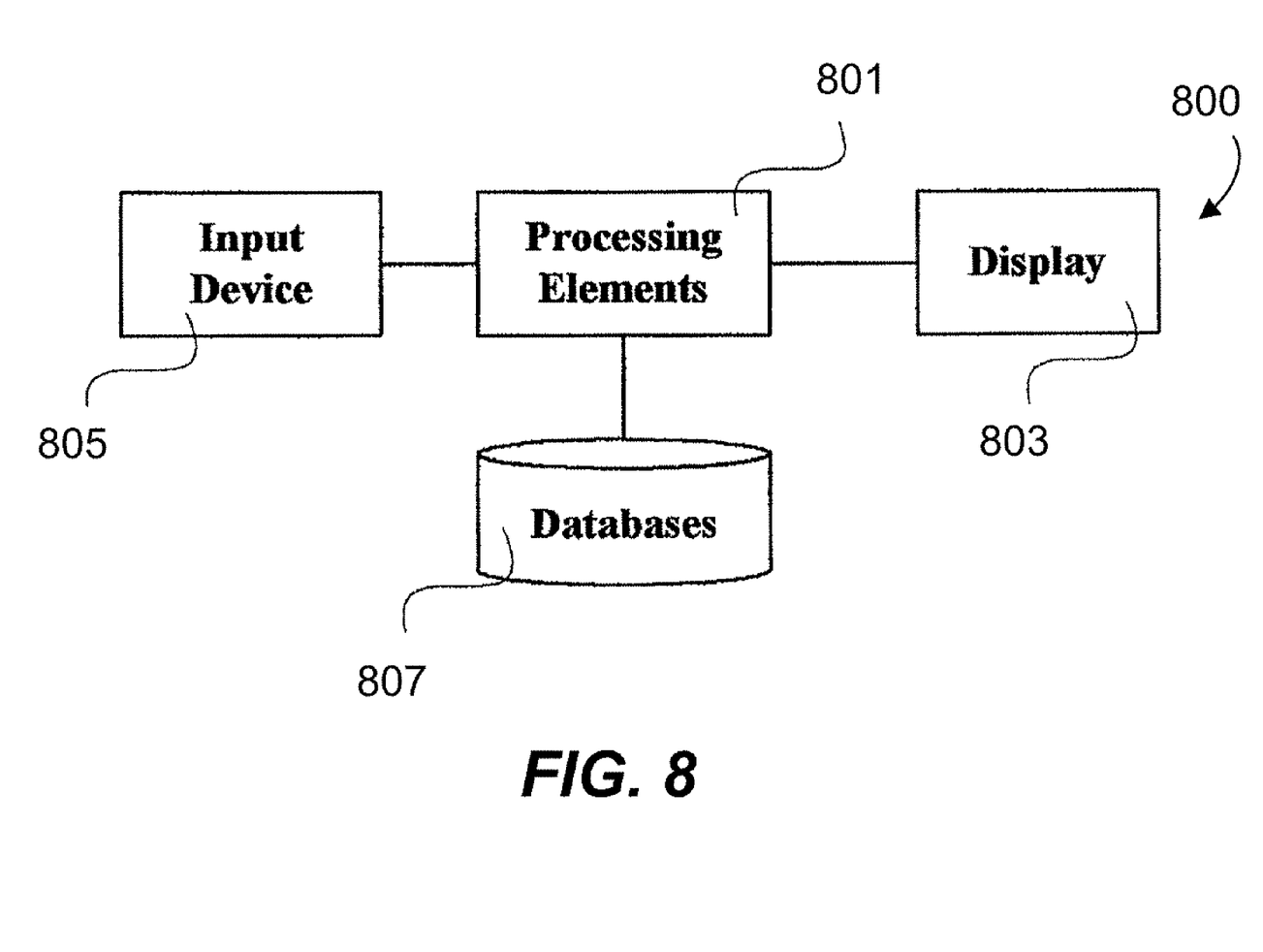
FIG. 8 is an embodiment of an architecture diagram for a computer implementation that can be used to perform methods described herein, in accordance with aspects of the present invention.
Figure 9:
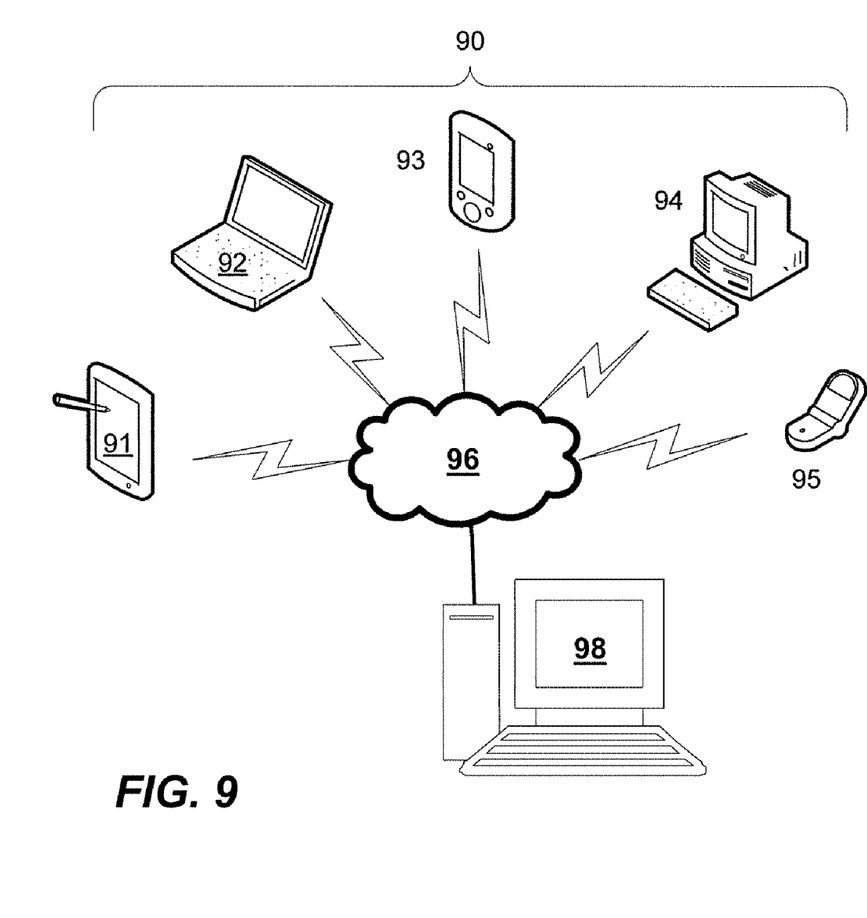
FIG. 9 is an embodiment of a network of computing devices, within which the present invention may be implemented.

System 10 can be implemented using one or more properly configured computers, for example, including one or more computer processors and data storage devices, as well as input and output mechanisms or devices, as described above. FIGS. 8 and 9, which are described below, depict computers at a high level, and system 10 could be implemented using on or more of such computers.

In one exemplary embodiment, the Query Input Module 20 may provide an interactive query entry form or field for query submission by a user, e.g., via a computer display screen. In another exemplary embodiment, a programmatic interface may be provided to allow query submissions originating from other automated systems. The Query Input Module 20 supplies the received query to the Knowledge Search Engine 30 and the Research Event Recorder 50 for processing. The Knowledge Search Engine 30 processes the query and retrieves result sets from the searchable Databases 40. The searchable Databases 40 include machine readable stores of information from which results are to be retrieved, and can be collocated or remote to each other.

The Research Event Recorder 50 analyzes queries to determine their significance in the user's research session and the appropriate form of representation in the Knowledge Research Map 70. The Research Event Recorder 50 also records the information in the Knowledge Research Map 70. The Results Presenter 60 filters the result sets from the Knowledge Search Engine 30 to classify the results according to the research domain taxonomy of research questions, and records selected result information in the Knowledge Research Map 70. The Knowledge Research Map 70 also includes machine representations of user interactions that have been identified by the Research Event Recorder 50 and results which have been stored by the Results Presenter 60, as well as relationships between these interactions and stored results. The Research Reporter 80 transforms the interactions, stored results, and relationship information from the Knowledge Research Map 70 into a form which is readable and useful to the user, which can by presented via an output device such as a computer screen, as an example.

Figure 4A:
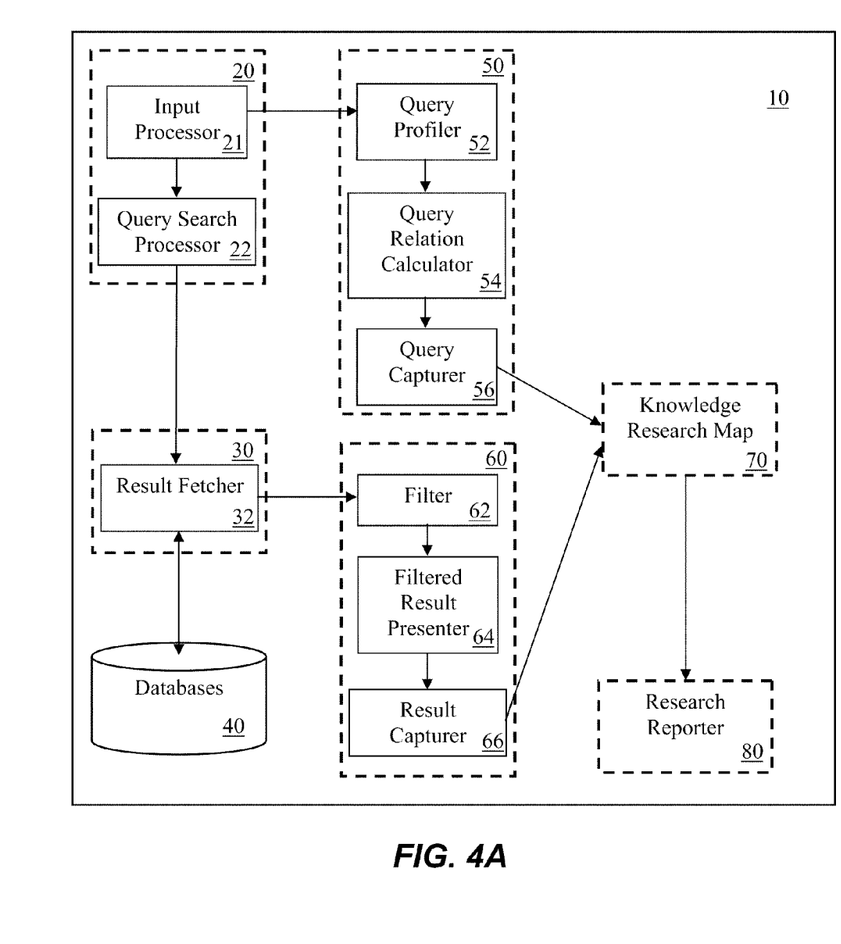
FIG. 4A is an architecture diagram that illustrates the system of FIG. 3, according to aspects of the present invention.
Figure 4B:
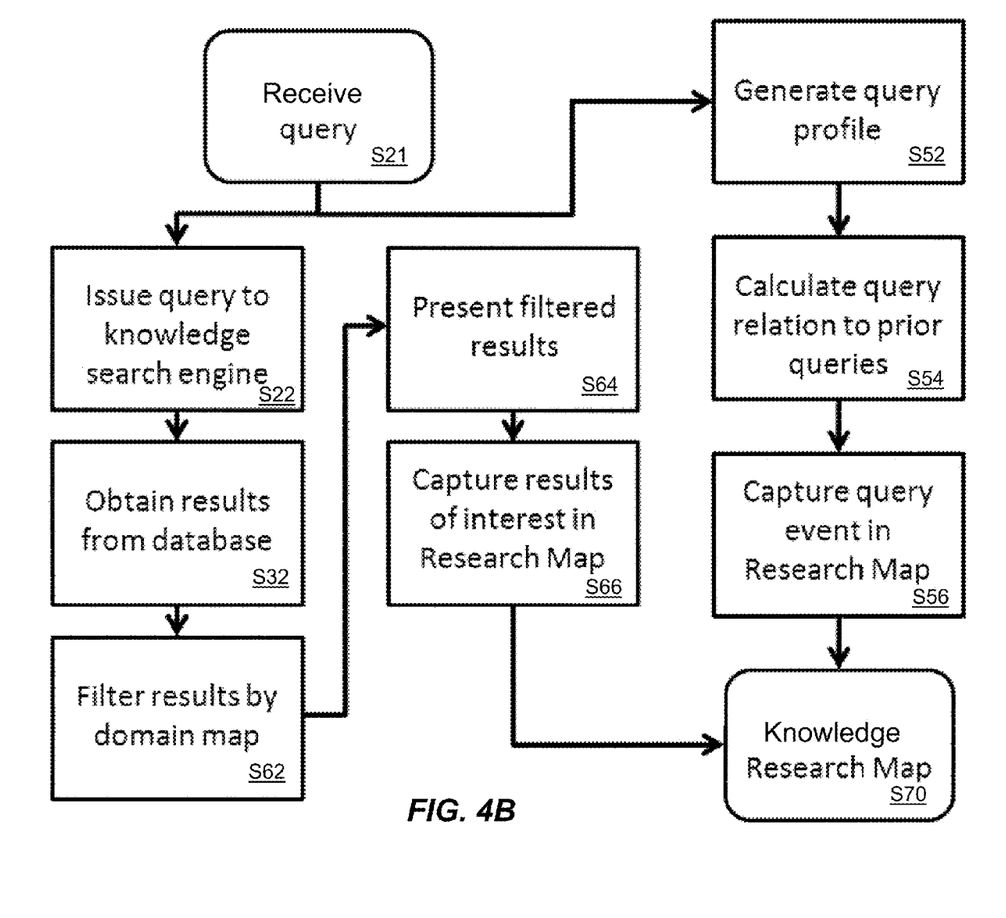
FIG. 4B is a flow diagram illustrating processing performed by the system of FIGS. 3 and 4A, according to aspects of the present invention.

FIG. 4A is an embodiment of the knowledge search and mapping system 10 of FIG. 3, as well as sub-modules that could be included therein. FIG. 4B shows a flow diagram that illustrates an embodiment of a method that may be performed by the system 10 depicted in FIG. 4A. As will be appreciated by those skilled in the computer arts, the architecture of FIG. 4A represents a set of functional modules that can perform the method of FIG. 4B using at least one properly configured computer, for example, such as the computer illustrated in FIG. 8. In some embodiments, each functional module in FIG. 4A is embodied in computer code stored in memory that is executed by at least one computer processor to perform the method of FIG. 4B.

Referring to FIGS. 3, 4A, and 4B, an input query is received by an Input Processor 21 of Query Input Module 20, at processing step Receive Query S21. The received query of S21 is processed in two operational sequences, which may be pursued either serially or in parallel. The received query of processing step S21 is provided to a Query Search Processor 22 of the Query Input Module 20 which, in processing step S22, issues the query to the Knowledge Search Engine 30. Knowledge Search Engine 30 searches at least one Database 40, for example, a semantically indexed database, for information relevant to the query to create a set of results. In this embodiment, a Result Fetcher 32 of the Knowledge Search Engine 30 obtains the results for the issued query from the Databases 40, in processing step S32.

A Filter 62 of the Results Presenter 60 filters results by domain and reformulates the obtained results into sets of classified results, in processing step S62. A domain can be determined from analysis, e.g., semantic analysis, of the received query, and perhaps earlier processed queries or user actions in the current search session. A Filtered Result Presenter 64 of the Results Presenter 60 presents the filtered results, in processing step S64. The Filtered Result Presenter 64 delivers the classified results to the user and provides an interactive model for the user to identify specific results of interest. For example, the classified results to the issued query, including the interactive model, may be automatically provided to a user in a graphical or text format via a computer display, e.g., see FIGS. 6-7. A Result Capturer 66 of the Results Presenter 60 stores results of interest in a machine readable form, in processing step S66. Specifically, the Result Capturer 66 captures results of interest in the Knowledge Research Map 70. An interest level of the results, or results of interest, may be determined from the user's interaction with the sets of classified results, e.g., more or longer interaction can mean higher interest.

Additionally, the received query of processing step S21 is also provided to a Query Profiler 52 of the Research Event Recorder 50. The Query Profiler 52 analyzes the query to identify key elements of the query and generates a query profile, in processing step S52. Key elements of the query may be determined by, for example, semantic analysis of the query (e.g., what are the Subject, Action, and Object of the query?). A query profile is a representation of the query that includes the key elements.

A Query Relation Calculator 54 of the Research Event Recorder 50 compares the key elements of the analyzed query with previously processed queries to determine the relationship of the analyzed query to previously processed queries, in processing step S54. There are a number of specific techniques which may be used to perform the classification of a specific query's relationship to prior queries, such techniques can include the steps of extracting key elements from the specific query to create the query profile, in processing step S52, and comparing the query profile with profiles of the prior queries, in processing step S54. A Query Capturer 56 of the Research Event Recorder 50 records the analyzed query and its relationship to prior queries in a machine readable form, in processing step S56. The recorded queries, query relationship information, and results of interest are assembled from their machine readable forms to create the generated Knowledge Research Map 70, in processing step S70. The Knowledge Research Map 70, which may then be automatically provided to a user in a graphical or text format, e.g., via a computer display. The processing described with respect to FIGS. 4A and 4B may all be done automatically by a computer in response to a received query.

As indicated above, the Knowledge Search Engine 30 is used to extract information from databases. The Knowledge Search Engine 30 includes one or more knowledge search tools. Knowledge search tools (also commonly referred to as search engines or database query tools) facilitate the efficient access to information stored in computer-based database systems. When applicable, a knowledge search tool and a database to be searched by it are defined herein as a "knowledge base." The user is able to locate relevant information by presenting a properly constructed query in an appropriate form, for example, a natural language or Boolean expression, to the knowledge search tool, which searches the database and obtains results. The knowledge search tool responds to the entered query by constructing a result set comprising a list of information that meets the relevancy criteria imposed by the knowledge search tool. An example of such a knowledge search tool is a computer-based system called Goldfire Intelligence™ marketed by Invention Machine Corporation, Boston, Mass. The technology used in this tool is partially described in U.S. Pat. No. 6,167,370, the contents of which are incorporated herein by reference.

Embodiments described herein utilize semantic indexing and search technology described in U.S. Pat. No. 6,167,370 for the purpose of performing knowledge searches. However, in alternative embodiments, other knowledge search tools may be used.

The Query Input Module 20 provides queries to the Knowledge Search Engine 30 for the extraction of information from databases. In one embodiment, the user supplies a query to the Query Input Module 20 through an interactive interface, e.g., a keyboard, mouse, and display or screen. In another embodiment, a query is supplied to the Query Input Module 20 by a software application through the use of a programmatic interface.

The results extracted from databases are processed by the Results Presenter 60. The Results Presenter 60 filters each result based on the classification of conceptual relationships between the result and query to which the result was a response. The conceptual relationship is a derivative of a domain of research of the research session, which can be represented as a concept map, as in FIG. 5.

A domain of research is a categorization of a knowledge domain that a user may be engaged in while using an application or system, in accordance with aspects of the present invention. Other research domains may represent topic areas, such as travel, shopping, entertainment and media, sports, social networking, or any other of a variety of general or specialized interest. That is, the present invention is not inherently limited to any particular research domain.

Figure 5:
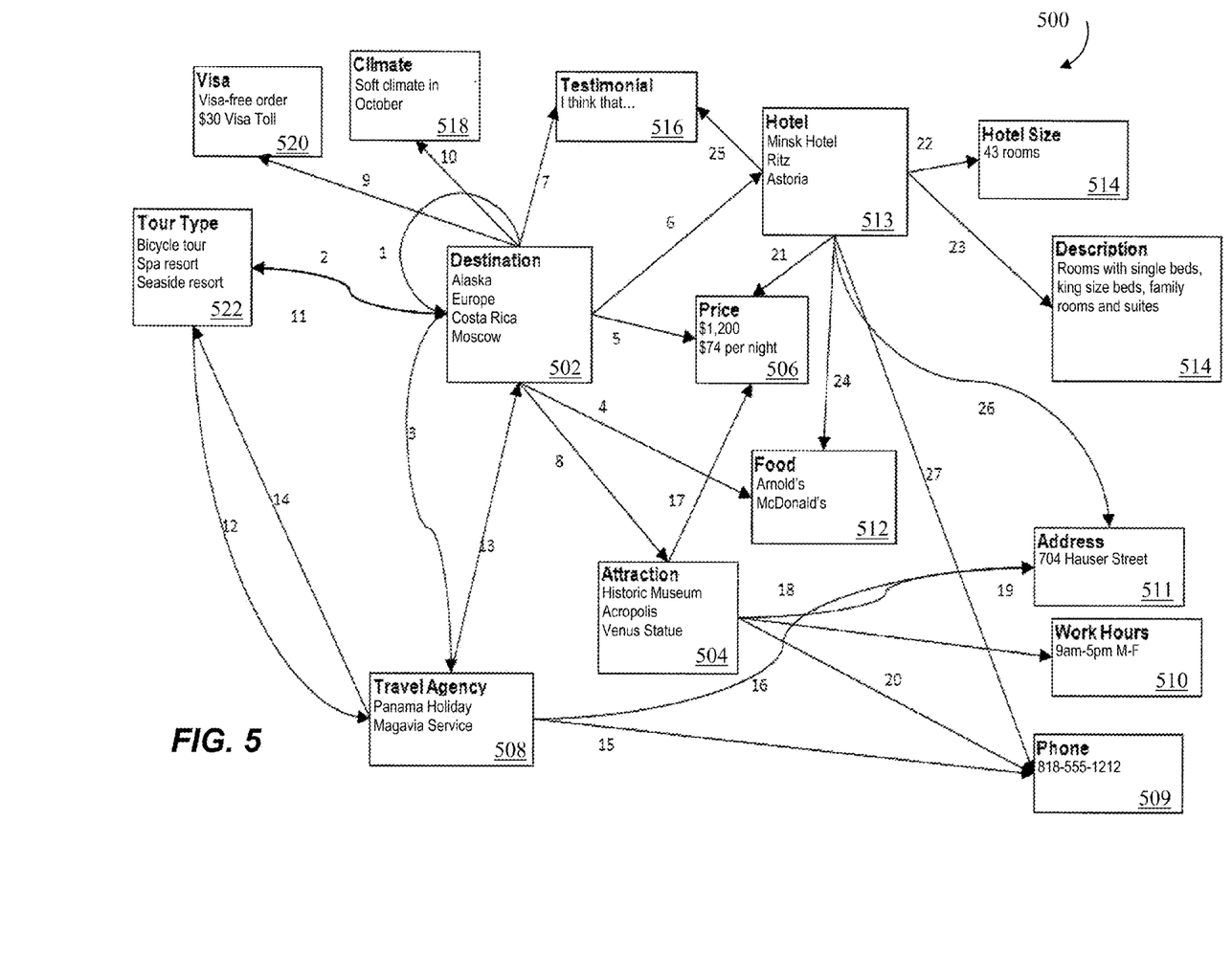
FIG. 5 is a knowledge domain concept map, in accordance with aspects of the present invention.

FIG. 5 is an embodiment of a knowledge domain concept map 500, in accordance with aspects of the present invention. In FIG. 5, the concept map represents a research domain of travel. The concept map identifies the entities of interest to a researcher of travel, as indicated during one or more research sessions. For example, Destination 502, Attraction 504, Price 506, Travel Agency 508, Phone 509, Work Hours 510, Address 511, Food 512, Hotel 513, Hotel Size 514, Description 515, Testimonial 516, Climate 518, Visa 520, and Tour Type 522 are identified entities. The arrows connecting the entities, for example, arrows 1-19, 23-29 and 31 represent relations or relationships of interest between the entities. In FIG. 5, as an example, the arrow 8 indicates a relation between the entity Destination 502 and the entity Attraction 504. This relation is one that can be useful to a researcher of the travel domain, as it is related to information that can answer questions of the form "What attractions are in Anaheim?" or "Where is Disneyland?," as examples.

In the present embodiment, the Results Presenter 60 of FIG. 3 uses meta-data tagging to identify the one or more research domain relationships with which a result to a query is associated. Such meta-data grouping allows efficient subgrouping of query results. The generated sub-groups are meaningful to the user by virtue of their intrinsic relevance in the domain of research.

The present exemplary embodiments use semantic technology to generate result meta-data tags; however, other techniques of meta-data tagging may be used to associate result data with research domain relationships. Such other meta-data tagging approaches include those known in the art, so not discussed in detail herein.

Figure 6:
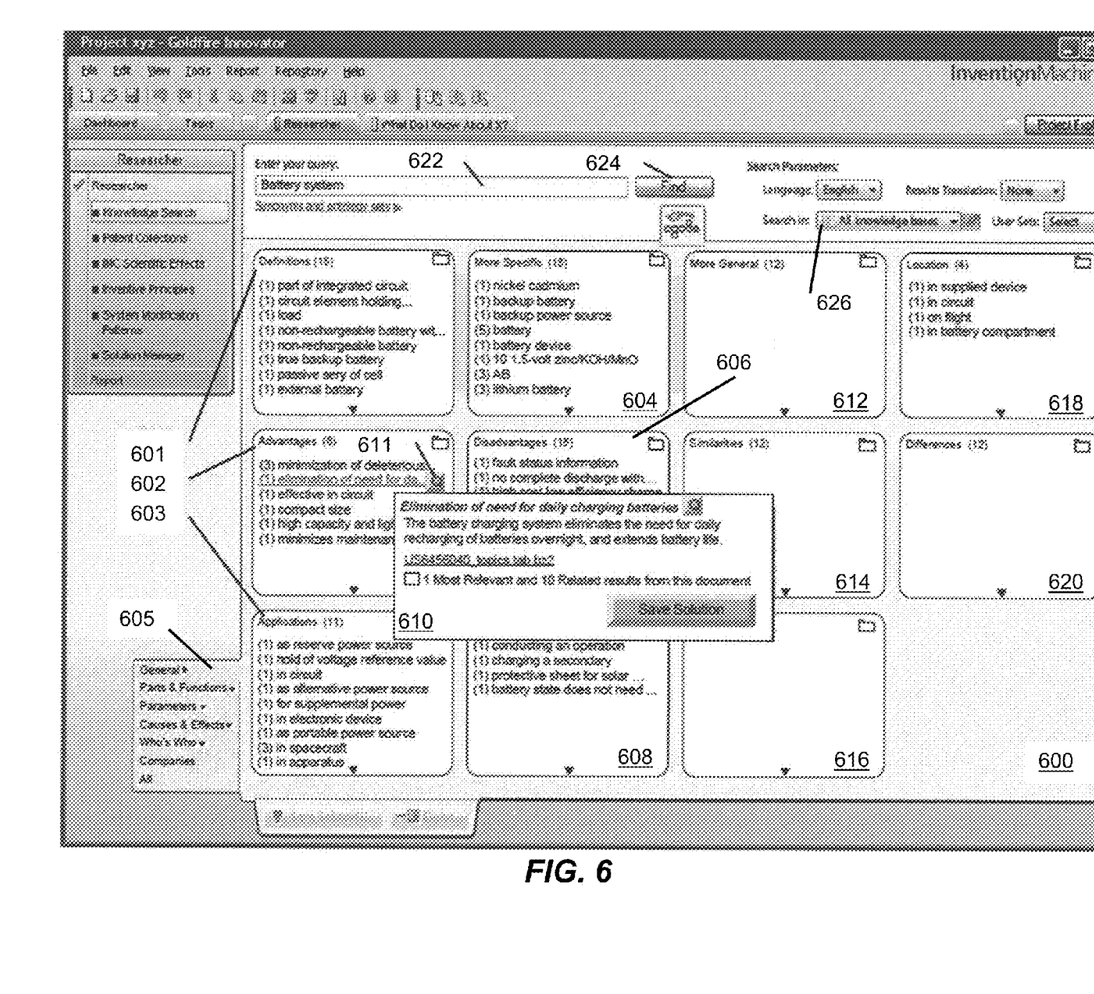
FIG. 6 illustrates an embodiment of a user interface for presenting search results to a researcher that have been filtered based on a domain of research, in accordance with aspects of the present invention.
Figure 7:
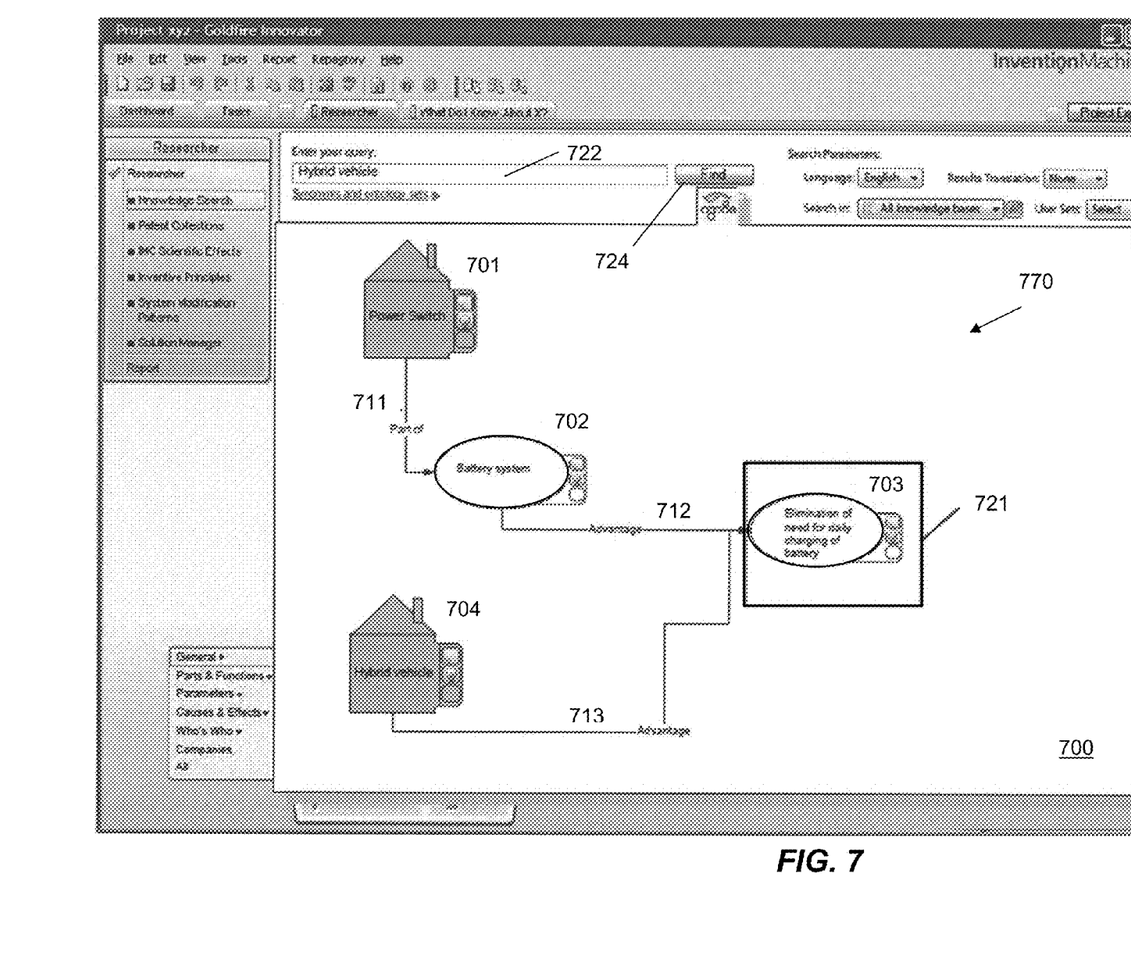
FIG. 7 illustrates an embodiment of a user interface for presenting a research knowledge map based on capture of researcher actions, in accordance with aspects of the present invention.

FIGS. 6 and 7 are described for an engineering device attribute research domain. FIG. 6 illustrates an embodiment of a user interface display screen 600 that may be generated by a knowledge search and mapping system 10, in accordance with aspects of the present invention, in a product manufacturing application and domain embodiment. This embodiment of a user interface 600 presents search results to a researcher that have been filtered based on the domain of research, i.e., the engineering device attribute research domain.

In FIG. 6, the term "Battery system" was entered into search field 622, and the button "Find" 624 was selected. This action caused presentation of filtered result sets that identify some of the relationship classifications relevant to the engineering device attribute research domain, namely: Definitions 601, Advantages 602, Applications 603, More Specific 604, Disadvantages 606, More General 612, Similarities 614, Location 618, and Differences 620, as examples. Boxes 608 and 616 represent other relationship classifications relevant to the domain. Alternatively, fewer, more, or different relationship classifications may be used.

Next to the title of each relationship classification, a number appears in parenthesis. This number indicates the number of results in the relationship classification, which are also listed below the title in each box. For example, in Definitions 601, there are 15 results, which are listed beneath "Definitions (15)." Next to each result is also a number in parenthesis. This number indicates a number of entries or responses found for the given result. For example, in Definitions 601, the number "(1)" appears to the left of "part of integrated circuit," which indicates there is only one response related to the "part of integrated circuit" result.

Referring again to FIG. 3, the Research Event Recorder 50 identifies and stores user interaction data, such user interaction data can include each query and its relationship to prior queries in the research session. These data are stored in the Knowledge Research Map 70. The resulting Knowledge Research Map 70 includes an entity-relationship model composed of entity-relationship-entity triplets, such that the entities represent query topics and the relationships represent the relationship in the informational taxonomy through which the query was generated. In the example FIG. 7, the "Part of" relationship is a member of the informational taxonomy of the engineering device attribute research domain.

The identification of the relationship between Knowledge Research Map 70 entities may occur via different methods that are specific to the method of user interaction.

In one embodiment, submitting a new query based on a selected result from the current query will result in the relationship between the current query and the new query as being designated by the relationship category of the filtered result set sub-group to which the selected result belongs. Referring again to FIG. 6, a button 611 is a query submission button. When the button 611 is selected, the associated result "Elimination of need for daily charging batteries" 610 is submitted as a new query. Since this result was selected from the filtered result set "Advantages" 602, the relationship of "Advantage" is established between the two queries. That is, it is established that "Elimination of need for daily charging batteries" is a possible advantage of some "Battery system," see also FIG. 7. Other methods of explicit action interpretation to establish query relationships may be employed.

In another embodiment, directly submitted queries are analyzed and their relationships to prior queries are computed algorithmically. In FIG. 6, box 622 is a user editable field in which the user may enter a new query directly. When a Find button 624 is selected, the user's query is recognized by the Query Input Module 20 and provided to the Research Event Recorder 50, see FIG. 3. A query profile is generated comprising attributes of the query. The new query profile can be compared to one or more prior query profiles to determine the relationship of the new query to each of the one or more prior queries. It may be determined that the new query is a rephrasing of a prior query, the new query is directed to a new topic related to the current query by a relationship concept from the research domain, or that the new query is entirely unrelated to any of the one or more prior queries. A closest-fit query can be selected from the one or more prior queries.

The Research Event Recorder 50 links queries that are re-phrasings of the closest-fit query to the closest-fit query entity in the Knowledge Research Map 70. The Research Event Recorder 50 identifies a new topic related to the closest-fit query as a new element for inclusion in the Knowledge Research Map 70 and generates a new entity-relationship-entity triplet to capture the linkage between the closest-fit and new query entities. The Research Event Recorder 50 will identify unrelated queries, but will not link these new queries to other entities, in the present exemplary embodiment.

The classification of new queries as rephrasing, related, or unrelated may be accomplished through different mechanisms. In embodiments using semantic technology, the subject, action, and object properties of a natural language query may be extracted and compared. Based on the change in the subject-action-object structure of the natural language expression, the degree of change in the query can be calculated and this measure of difference can be used to designate the new query into one of the classifications. Alternative methods of calculating query distance may be used to determine the query relationship classification. Word ontologies, synonym dictionaries, and similar word relation information may be used to recognize re-phrasings.

As indicated above, users may select specific query results to identify that the selected result is of special interest. When such a result selection is made through interaction with the Results Presenter 60, e.g., through the display, the designated result is linked to the active query entity in the Knowledge Research Map 70.

Various types of knowledge bases may be accessed in response to a query and these knowledge bases may be resident in various places. For example, FIG. 6 shows a "Search in" drop-down menu 626 that can be used to select specific knowledge bases for searching, or "All knowledge bases" can be search as is shown. One set of knowledge bases may be contained in the user's own computer memory, or portable memory devices such as CDs that may accessed at the user's location. Another set of knowledge bases is called a Corporate Knowledge Base, which may typically be on one or more servers resident or privately accessible to users within the organization, such as a corporation. Another set of knowledge bases is publicly accessible search engines and databases, such as Google™ (a search engine) and the U.S. Patent and Trademark Office patent collection (a searchable database).

FIG. 7 illustrates an embodiment of a user interface screen 700 generated by a knowledge search and mapping system 10 for the engineering device attribute research domain, in accordance with aspects of the present invention. The user interface screen 700 can be used for presenting a research knowledge map 770 based on capture of researcher (user) actions. FIG. 7 illustrates how a Knowledge Research Map 770 may be rendered for viewing by the user via the Research Reporter 80, see FIG. 3. Other embodiments may use other graphical or text based methods of rendering the Knowledge Research Map 770 for viewing.

Graphical elements, 701, 702, 703, 704, represent query topics or entities that have the loci of search activities during a research session. Specifically, graphical element 701 represents a "Power Switch;" graphical element 702 represents a "Battery system;" graphical element 703 represents the advantage of "Elimination of need for daily charging of battery;" graphical element 704 represents a "Hybrid vehicle." The connecting lines, 711, 712, 713, represent the relationships between the query entities. Each connecting line has a sense of directionality associated with it indicated by the arrow heads at one end of each connecting line. These connecting lines inform the user of the history and intent of their research activities. For example, the connecting line 711, between the graphical elements 701 and 702, indicates that the user had been examining the topic of "Power Switch" and then subsequently began to examine the topic of "Battery System," having found that the concept "Battery System" was related to the "Power Switch" concept by a "Part of" relationship. For example, a power switch may be a part of a battery system.

As mentioned above, a "Part of" relationship is a member of the informational taxonomy of the engineering device attribute domain, where the identification of the relationship between Knowledge Research Map 70 entities may occur via different methods that are specific to the method of user interaction. Here, the "Part of" relationship is merely an example. Similarly, the connecting line 712 indicates that entity 703, namely, "Elimination of need for daily charging of the battery," is an "Advantage" of entity 702, which is another form of relationship. Many other types of relationships could exist between entities in a Knowledge Research Map 70.

A further example of a benefit of knowledge search and mapping system 10, including the enhancement to existing knowledge search tools, is the ability to automatically identify and capture shifts in the locus of research or results of interest, as indicated by the user's interaction with a presented result set.

In various embodiments, the user may use the rendered Knowledge Research Map 770 as a navigational device to change the current locus of research. In FIG. 7, box 721 enclosing the entity 703 indicates that the topic represented by entity 703, namely, "Elimination of need for daily charging of the battery," is the current locus of research. In this example, the action of selecting (e.g., via a clicking action in the user interface) the "Power Switch" entity 701 would result in the locus of research being changed to the topic of "Power Switch". Other embodiments could use other modes of navigational interaction, as is appropriate for the method of Knowledge Research Map 770 rendering.

As illustrated in FIG. 7, box 722 is a user editable field in which the user may enter a new query directly. In FIG. 7, a new query, namely "Hybrid vehicle," is entered into a search box 722. When "Find" button 724 is selected, the new query is submitted. In FIG. 7, the new entity 704, namely, "Hybrid vehicle" is related to the entity 703. Specifically, entity 703 is an Advantage of entity 704, wherein Advantage is the relationship between the two query entities. In some embodiment, the use could also select the "Hybrid vehicle" icon to submit the new query.

FIGS. 6 and 7 illustrate an embodiment of an application in accordance with aspects of the present invention in the context of research activity for physical product device design and manufacturing. However, the systems and methods illustrated for the context of physical product device design and manufacturing are equally applicable to embodiments in the context of other areas of research activity.

Embodiments in accordance with aspects of the present invention may be implemented in specially configured computer systems, such as the computer system illustrated in FIG. 8. FIG. 8 is an architecture diagram for an embodiment of a computer implementation, in accordance with aspects of the present invention. The computer system 800 of FIG. 8 may include processing elements 801, a display 803, an input device 805, and a link to databases 807 (or other computer-readable storage media) that provide the necessary information to provide responses to queries. Embodiments may also be provided by computer-executable instructions resident on one or more computers and executable by one or more microprocessors, microcontrollers, or other processing devices. The computer-executable instructions for executing the system and method may be resident in memory in the processing devices or may be provided to the processing devices by floppy disks, hard disks, compact disk (CDs), digital versatile disks (DVDs), read only memory (ROM), or any other non-transitory storage medium. Additionally, the system may access one or more other computers, database systems etc. over a network, such as one or more of the Internet (and World Wide Web), intranets, extranets, virtual private networks, or other networks.

Those skilled in the art will appreciate that applications, functional modules, and/or processors described herein can include hardware, software, firmware, or some combination thereof. To the extent software or computer program code (sometimes referred to as an "application") is used in various embodiments, it may be stored on or in any of a variety of non-transitory storage devices or media, and executed by one or more processors to achieve explicit, implicit, and or inherent functions of the systems and methods described herein. Such storage devices or media, and such processors, can be collocated or remote to each other, whether logically or physically.

As used herein, unless otherwise indicated, a computer can take the form of any known, or hereafter developed, device that includes at least one processor and storage media. For example, referring to FIGS. 8 and 9, a computer or computer system can include a server 98, personal digital assistant (PDA) 91, laptop computer 92, portable music device 93, personal computer 94, cell phone 95, workstation (not shown), mainframe (not shown), or the like, or some combination thereof. Such devices may include one or more input devices, which may include a keypad or keyboard, microphone, video camera, touch-screen, and the like, as examples. Such devices may also include one or more output devices, which may include a video screen (e.g., computer, cell phone, or PDA screen), touch-screen, image projection system, speaker, printer, and the like, as examples. In some embodiments, a data port may also be considered an input device, output device, or both. In some embodiments, a variety of user devices 90 may interact with a knowledge search and mapping system 10 hosted on computer 98, which can be accessible via the Internet, as an example.

To the extent any elements described herein are remote to each other, they may communicate and/or exchange information over any of a variety of known, or hereafter developed, networks 96, e.g., local area networks, wide area networks, virtual private networks, intranets, computer-based social networks, cable networks, cellular networks, the Internet, the World Wide Web, or some combination thereof.

According to aspects of the present invention, since relevant knowledge acquired in the process of research includes not only the specific facts that may be located via a knowledge search tool, but also the contextual relationship of facts to both submitted queries and other facts, the scope and history of the research exploration, the research locus change identification and recording and the user intent-based results filtering capabilities, the knowledge search tool presents immediate and compelling benefits to the user. A new paradigm of research activity is enabled wherein the user is able to engage in dialogue with the universe of available knowledge accessible through selected knowledge bases; the dialogue effected through a series of queries. According to the interaction model of the present invention, the implicit information about contextual relationships and research scope and history is captured and available to a user. The availability of this information results in greater research productivity and effectiveness as the user is able to understand the context of information in a way that increases overall understanding of research data.

The foregoing Detailed Description of exemplary and preferred embodiments is presented for purposes of illustration. The disclosure of embodiment herein is not intended to be exhaustive nor to limit the invention to the precise form(s) described, but only to enable others skilled in the art to understand how the invention may be suited for a particular use or implementation.

The possibility of modifications and variations will be apparent to practitioners skilled in the art, having the benefit of this disclosure. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

It is, therefore, understood that various modifications may be made and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A computer-based method of knowledge research and mapping, the method comprising:

providing at least one computer processor coupled to at least one non-transitory storage medium, the at least one computer processor performing a set of processing tasks, including:
generating a research knowledge map using an entity-relationship model comprising entity-relationship-entity triplets, including representing topics determined from the one or more queries as entities and determining relationships between entities from an informational taxonomy;
receiving a query related to a domain of research;
storing the query in the research knowledge map in the at least one computer storage medium;
automatically submitting the query to one or more knowledge bases;
filtering one or more responses to the query into response relationship subsets; and
linking one or more of the responses from the response relationship subsets to the stored query in the research knowledge map,
wherein the knowledge map provides interrelated information for one or more queries within the domain of research.

2. The method according to claim 1, wherein the entities representing one or more queries have linked to them one or more responses to the queries.

3. The method according to claim 1, wherein the response relationship subsets are classified as sub-groups of the one or more responses to the query that are related through a common relationship of information taxonomy with the query.

4. The method according to claim 1, wherein submitting the query to one or more knowledge bases comprises submitting the query to a knowledge search engine and automatically formatting the query to be compatible with the knowledge search engine.

5. The method according to claim 4, including formatting the query as either a natural language query or a keyword query.

6. The method according to claim 4, wherein the knowledge search engine comprises a semantic indexing and search tool and the one or more knowledge bases comprise a semantic analysis knowledge base.

7. The method according to claim 1, wherein the knowledge bases comprise one or more knowledge bases selected from a group consisting of: one or more locally accessible knowledge bases; one or more knowledge bases containing corporate knowledge; and one or more publicly accessible knowledge bases.

8. The method of claim 1, further comprising:
recording user interactions during a research session related to the query and storing machine representations of the user interactions in the research knowledge map.

9. A knowledge research and mapping system, comprising:
at least one computer processor coupled to at least one non-transitory storage medium;
a research knowledge map stored in the at least one non-transitory storage medium and generated by the at least one processor using an entity-relationship model comprising entity-relationship-entity triplets, such that topics determined from the one or more queries are represented as entities and relationships between entities are determined based on an informational taxonomy;
a query input module that:
receives a query related to a domain of research;
stores the query in the research knowledge map; and
submits the query to one or more knowledge bases;

a results presenter that filters one or more responses to the query into response relationship subsets; and a research event recorder that links one or more responses from the response relationship subsets to the stored query in the research knowledge map, wherein the knowledge map provides interrelated information for one or more queries within the domain of research.

10. The system of claim 9, wherein the entities representing one or more queries have linked to them one or more responses to the queries.

11. The system of claim 9, wherein the response relationship subsets are classified as sub-groups of the one or more responses to the query that are related through a common relationship of information taxonomy with the query.

12. The system of claim 9, wherein the query input module submits the query to a knowledge search engine and formats the query to be compatible with the knowledge search engine.

13. The system of claim 12, wherein the query is formatted as either a natural language query or a keyword query.

14. The system of claim 12, wherein the knowledge search engine comprises a semantic indexing and search tool and the one or more knowledge bases comprise a semantic analysis knowledge base.

15. The system of claim 9, wherein the knowledge bases comprise one or more knowledge bases selected from a group consisting of: one or more locally accessible knowledge bases; one or more knowledge bases containing corporate knowledge; and one or more publicly accessible knowledge bases.

16. The system of claim 9, wherein the research event recorder records user interactions during a research session related to the query and stores machine representations of the user interactions in the research knowledge map.

17. A computer program product having computer-executable instructions stored in at least one non-transitory computer-readable medium, which perform a method of knowledge research and mapping when executed by at least one processor, the method comprising:

generating a research knowledge map using an entity-relationship model comprising entity-relationship-entity triplets, including representing topics determined from the one or more queries as entities and determining relationships between entities from an informational taxonomy;

receiving a query related to a domain of research;

storing the query in the research knowledge map in the at least one computer storage medium;

automatically submitting the query to one or more knowledge bases;

filtering one or more responses to the query into response relationship subsets; and linking one or more of the responses from the response relationship subsets to the stored query in the research knowledge map, wherein the knowledge map provides interrelated information for one or more queries within the domain of research.

\* \* \* \* \*